Dec. 22, 1925.
J. P. BEM
1,566,463
FRUIT PITTING APPARATUS
Filed Oct. 6, 1924
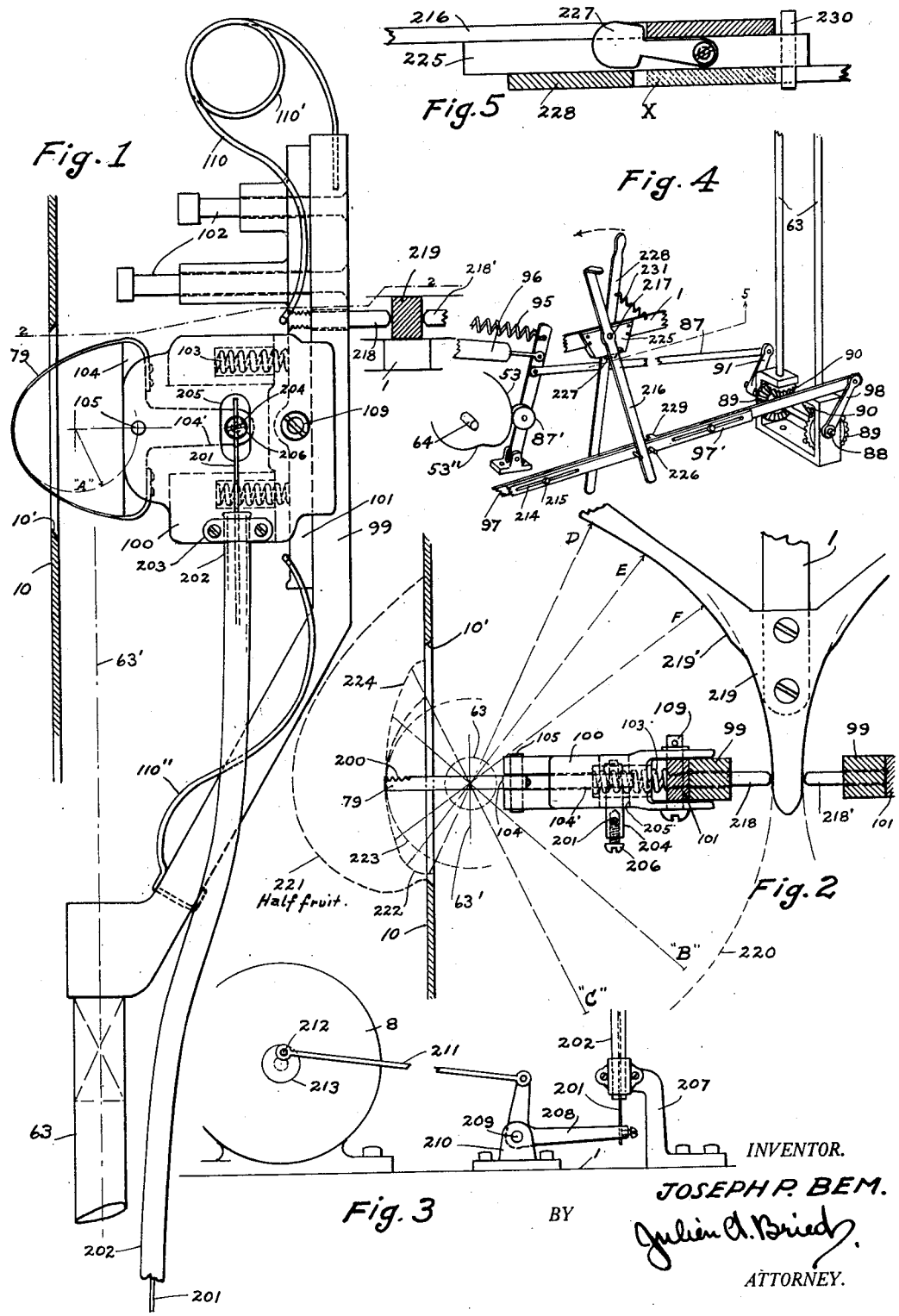
INVENTOR.
JOSEPH P. BEM.
BY
Julien A. Bried
ATTORNEY.

Patented Dec. 22, 1925.

1,566,463

UNITED STATES PATENT OFFICE.

JOSEPH P. BEM, OF FRESNO, CALIFORNIA, ASSIGNOR TO PACIFIC PITTING MACHINE COMPANY INC., OF FRESNO, CALIFORNIA, A CORPORATION OF CALIFORNIA.

FRUIT-PITTING APPARATUS.

Application filed October 6, 1924. Serial No. 741,870.

*To all whom it may concern:*

Be it known that I, JOSEPH P. BEM, a citizen of the United States, residing at Fresno, in the county of Fresno and State of California, have invented new and useful Improvements in a Fruit-Pitting Apparatus, of which the following is a specification, and which is illustrated in the accompanying drawings.

This invention relates to fruit pitting or coring apparatus in general, and in particular to the type of apparatus shown and described in my co-pending application for patent on peach pitting machine, filed May 9, 1924, under Ser. No. 712,060, and has to do with certain improvements in the knife operating and controlling mechanism therefor.

The objects of the improvements are to provide knife operating and controlling mechanism which will accomplish certain results either not accomplished, or not so well, in the former mechanism of the co-pending patent application referred to, and to better adapt the machine to the coring of fruits, such as pears, etc., which have no single large pit for guiding the resiliently mounted knives around the core.

Since the improvements herein described concern knife actuating and control elements which are adapted for direct use in the mechanism so fully shown and described in my co-pending application aforesaid, the drawings hereto will be confined to the improved parts only together with enough of the associated parts as to make them operative, as the general operation of the whole machine as previously shown is not altered, and the parts shown in the drawings hereto will bear similar designating numerals to the parts shown in the drawings in said co-pending application where they perform the same functions.

In the drawings, Figure 1 is an approximately full size side elevation of one of my arched oscillating pitting blades complete in its mounting, Figure 2 is a sectional plan view of Figure 1 taken along the line 2—2 thereof and showing the cam control for the blade travel, Figure 3 is a reduced broken elevation of the machine parts showing the connections to the motor for oscillating the blade, and Figure 4 is a reduced perspective broken view showing the operating and control elements for swinging the blades, and Figure 5 a larger detail of the blade release lock on the control lever, taken on the line 5 of Fig. 4.

With reference to the drawings, it should be noted that but one complete blade and its actuating mechanism is shown, tho in the actual machine two blades are used, one for pitting each half of the peach presented, each against a confronting pitting table 10 for cutting out the half pit or core by the arched blade 79 swinging in a curve through the fruit half upon revolving the shaft 63 about a half turn.

The form of the blade is changed somewhat from the previous disclosure, and its pivotal point 105 on the rocking bar 104 is displaced somewhat from the center of the arch formed by the blade in order to give greater clearance for a large half pit to pass between the top of the rocking bar and the inside of the blade without the necessity of greatly increasing the arch of the blade with a resulting increased waste of fruit cut away with the pit. In fact, the arch of the blade is preferably a compound curve and the displacement of the pivotal support from the true center of the arch of the outer curve of the blade may be considerable, and is in Figure 1 shown to be on the opposite side of the diameter of the curve "A" of the blade.

At the outer end of the arch small teeth 200 are preferably formed on the cutting edge of the blade.

The arched blade is free to rise and fall bodily with the carriage 100 and carrier 101 from the offset portion 99 of the shaft 63 guided by the pins 102 projecting from the offset shaft while being resiliently held down or forced in direction of the offset shaft by the spring 110 reacting against the carrier 101, all as previously shown and described in my co-pending applicaton referred to, tho the form of the spring 110 and its point of application is changed slightly as the spring is now formed of wire with a loop at 110' with one end of the wire secured to the offset shaft 99 and the other resting against the carrier 101 to force it toward the shaft. Also another spring 110'' is now used, also secured to the shaft and reacting at its other end at the other end of the carrier so as to provide a more even pull to the carrier in rising and falling on the guide pins 102.

The carriage is, as in the co-pending application, free to rock on pivot 109 while stabilized in its central position by concealed springs 103 in the carriage pressing equally against the carrier 101.

The rocker bar 104 instead of being rocked by a revolving cam as before and which required the use of several universal joints, is now rocked by a reciprocating wire 201 in the form of a flexible Bowden cable with its shell 202 secured to the carriage 100 in a clamp bracket 203.

The rocker bar 104 takes the form of a T arm pivotally mounted in a slot in the carriage and with a stud 204 projecting therefrom through a small slot 205 in the side of the carriage, and the wire 201 of the cable passes through a hole in the side of the stud and is secured thereto by a screw 206 which puts a slight crook in the wire at the point of contact to effectually hold it from slipping.

The wire is free for slight displacement laterally relative to the end of the shell or casing 202 from which it extends, so as to accommodate the angular variation due to rocking the arm 104' of the rocker bar, and the cable being flexible and extending down alongside of the shaft 63 offers no impediment to the shaft 63 in making its half revolution in pitting the half fruit, or to the bodily rise or tipping of the carriage 100 in yielding to the form of the pit.

At the lower end of the cable a bracket 207 secured to the frame 1 of the machine supports the shell 202 of the cable while the wire 201 is oscillated by a bell crank rocker arm 208 pivoted at 209 to a bracket 210 also secured to the machine frame and rocked by an eccentric rod 211 actuated by any available moving part of the machine or auxiliary motor, but here shown as connected to a crank pin 212 extending from a crank disk 213 on the main drive motor 8 of the machine, tho it must be understood that since the operation of the wire should be extremely rapid this crank drive may be geared up to any desired speed, or any other eccentric or cam arrangement, magnetic, or and other method of vibrating the wire may be used.

The rocking of the knife shafts 63 is effected as before by resilient means (the spring 95) so that the pitting blades can stop at any point of their travel while cutting, and they are returned after finishing the cut by power from the cam 53.

Figure 4 shows all of this in conformity with the previous disclosure, the two shafts 63 each having a bevel gear 90 at their lower ends meshing with confronting bevel gears 89 carried on a rock shaft 88 rocked back and forth by a rod 87 resiliently pulled by the spring 95 to swing the blades through the fruit halves upon being permitted to do so when the cut away portion 53'' of the cam 53 revolves to a position under the cam roller 87' of the rod 87.

This action is all substantially as previously disclosed, including the clutch control rod 97 connected to an arm 90 connected for movement with the shaft 88 for return each time with the completed movement of the knife shafts 63 to release the clutch lock (not shown) for effecting the next automatic forward motion of the machine, and the air cylinder 96 to prevent too sudden a return of the rod 87 in case no fruit was in place over the blades, with the important exception that I now provide manually operated means for throwing the blades back to starting point from any point of the cutting stroke, so that in event of the blades sticking for any reason they may be instantly thrown back to starting point for a fresh travel through the cut, and which usually clears the obstruction, or, if not the blades may thus be thrown to starting point out of the fruit and the machine then tripped for its next automatic movement to carry the fruit away from the pitting tables for ejection from the machine whether the same be pitted or not.

This may be accomplished in many different ways in an automatic machine of this character, and I do not wish to be confined to the exact method of carrying it out as shown in Figures 4 and 5, and which consists in making the automatic clutch tripping bar 97 double, that is, providing an auxiliary bar 97' slidably positioned on the main bar 97 so that either one will trip the clutch (not shown) by any suitable connection as previously disclosed.

The auxiliary bar is slotted at 214 and is slidable on pins 215 projecting from the main bar, and the auxiliary bar may be moved back and forth independently of the main bar by the hand lever 216 pivoted at 217 to a bracket or plate 225 carried by a suitable brace 1 of the machine frame. The upper end of the hand lever is adapted for gripping and moving by the operator and the lower end passes freely between two pins 226 projecting from the side of the auxiliary bar so that it may be moved in either direction by manipulating the lever, but normally is prevented from being so moved by a latch 227 which locks it from being moved to trip the machine except when the latch is released upon the blades being thrown back to starting position free from engagement with the fruit.

To thus throw the blades out of the fruit and release the latch I provide another hand lever 228 pivoted on the pin 217 on the opposite side of the bracket and with its lower end lying adjacent the main bar 97 so that when the upper end of the lever is pulled in direction of the arrow the lower end will move alongside the bar 97 and when it engages a lug 229 formed on the further side of the bar it will force the bar to the right and revolve the rock shaft 88 also the knife shafts 63 (against the pull of spring 95) and thus throw out the blades at any point of their stroke.

Thus the blades may be let in and out of the cut if desired, under influence or pull of spring 95, and when thrown completely out to starting point the lever 228 passes the latch by traveling along the bracket to the point X (Figure 5) so that either lever, but not both, will be free for movement in the opposite direction, and upon either being so moved the other is immediately locked by the latch being pushed out in front of it.

Figure 5 shows the action of the latch, and a pin 230 projects entirely through the bracket plate to form a stop for both levers against being moved too far beyond the latch.

It will thus be seen that upon the blades being thrown out by lever 228 the lever 216 may be pushed to trip the machine for its next movement, and that the blades will then be locked out of the fruit, or against any further operative movement, until lever 216 is returned to the position shown in Figure 4 so as to free lever 228 from contact with the lug 229 and thereby restore operative freedom to clutch releasing bar 97. A small spring 231 may be hooked to lever 228 as shown so that it will at once swing clear of the latch when released by moving the other lever.

Instead of the resiliently mounted blade of each shaft being guided in its path around the pit only by the pit as formerly, I have provided controlling means so that the arc of travel through the fruit, or at any point of travel in the fruit, may be predetermined, yet still be subject to the resilient action of the blade on its rising and rocking carriage 100, so that it may rise over a pit greater than any arc of travel so determined. This is accomplished by having a pin 218 secured to the rising carrier 101 and projecting freely through the offset portion 99 of the shaft 63, and through which arrangement the carriage with its blade may be forcibly pushed outward against the returning action of springs 110 and 110'' by any suitable guiding device at any desired part of its travel.

The device chosen to act against the pin 218 takes the form of a cam 219 shown double in Figure 2 to simultaneously control the other pitting blade also through its control pin 218'. The cam is secured in any convenient manner to a portion 1 of the frame of the machine, and it will be noted that the cam surface if given the same curve as the normal arcuate path 220 of the pin 218 in swinging around the axis 63' of its shaft 63 would of course not affect the swath of the blade, but if brought within that arc as shown at 219' will force the pin outward and with it the carriage and its blade.

This provides for the arched blade 79 entering the half peach or fruit 221 in a line perpendicular to the face of the pitting table 10 for a short space as indicated at 222 (Figure 2) instead of the normal arcuate curve of travel dotted at 223, thus completely clearing the stem end of the pit in case it happened to be a split pit displaced from its expected position as determined for normal pits through exact position of the half fruit with reference to its stem end over the opening 10' upon the table by the machine.

This cam control it will be observed, leaves the blade free to rise or rock to conform to the pit, yet prescribes a minimum recedence of the blade in direction of the pit irrespective of the pit unless the cam lies without the normal arcuate path of pin 218 as mentioned, and therefore it is possible to give the cam surface any form whatever so that the pin will be acted upon at any point or points of its travel, thus in coring a half pear having no pit to guide the blade, the blade may be made to enter the pear abruptly, follow a long shallow path as indicated at 224 and withdraw abruptly at the leaving point, so as to remove the long shallow core of the half pear without the waste which would be caused by swinging the blade in a half circle through the fruit.

To accomplish the above, and with reference to Figure 2, the cam 219 would simply extend to force the pin 218 from the normal arc 220 to intercept the points denoted by the ends of dotted lines B, C, at the final end of the cut, and the ends of the lines D, E, F as shown, at the beginning of the cut.

The feature just described is of great value in adapting the apparatus to various kinds of fruit, or determining the entry of the blade to a specific kind of fruit, and while I show a specific cam for effecting this control it is possible that other methods of control may suggest themselves by reason of this disclosure and any such are intended to be covered by the claims hereto appended.

It should also be noted that in its preferred form my arched blade is pivoted distinctly beyond the center of its curve which results in greater clearance for the pit without corresponding waste, and while this would seem to cause a detrimental action or vibration of the blade in use, this appears to be completely absorbed, probably due to the slight flexibility of the blade itself combined with the yielding flesh of the fruit.

My use of the words "pit" or "pitting" in the claims is intended to embrace the meaning of the words "core" or "coring."

I claim:

1. In a fruit pitting mechanism of the character described, an arched blade mounted on a rocker bar, said rocker bar being pivotally supported for oscillation on an axis extending transversely of the plane of the arch at a point distant from the top of the arch beyond its main axis, and means for oscillating the rocker bar on said first mentioned axis.

2. In a fruit pitting mechanism of the character described, an arched blade mounted on a rocker bar, said rocker bar being pivotally supported on an axis extending transversely of the plane of the arch at a point distant from the top of the arch beyond its main axis, said blade having teeth formed on its cutting edge adjacent the top of the arch only, and means for oscillating said rocker bar on said first mentioned axis.

3. In a fruit pitting mechanism of the character described, an arched blade mounted on a rocker pivoted to rock on an axis passing perpendicularly through the plane of the arch located at a point eccentric to the main axis of the arch.

4. In a fruit pitting mechanism of the character described, an arched blade secured at opposite ends to a rocker, said rocker being spaced from the top of the arch to present a clear arch space of more than a full half circle.

5. In a fruit pitting mechanism of the character described, an arched blade secured to a rocker adapted to rock on an axis passing perpendicularly through the arch, said rocker being spaced from the top of the arch to present a clear arch space of more than a full half circle.

6. In a fruit pitting mechanism of the character described, an arched blade secured to a rocker bar while presenting a clear space between the blade and bar for cutting out the half pit of a fruit half, said bar being pivotally supported for oscillation on an axis perpendicular to the plane of the arch, and means for rocking the bar comprising a wire secured at one end thereto, and means at the other end of the wire for moving same longitudinally.

7. In a structure as specified in claim 6, said wire being slidably sustained in a casing intermediate its ends, and the means for moving the wire longitudinally comprising a rocker arm to which the wire is secured, and means for rocking the arm.

8. In a fruit pitting mechanism of the character described, a revolvable shaft, an arched blade carried thereby and adapted upon turning of the shaft to travel in an arcuate path for pitting a fruit half, said blade being yieldably mounted on the shaft, and means for varying the relation of the blade to the shaft while turning the same.

9. In a fruit pitting mechanism of the character described, a revolvable shaft, an arched blade carried thereby and adapted upon turning the shaft to travel in an arcuate path for pitting a fruit half, said blade being yieldably mounted on the shaft and provided with means for resiliently forcing it toward the shaft, and means opposing said first mentioned means for varying the relation of the blade to the shaft while turning the same.

10. In a fruit pitting mechanism of the character described, a revolvable shaft, an arched blade carried thereby and adapted upon turning of the shaft to travel in an arcuate path for pitting a fruit half, and means for modifying the normal path of travel of said blade upon turning the shaft.

11. In a fruit pitting mechanism of the character described, a revolvable shaft, an arched blade carried thereby and adapted upon turning of the shaft to travel in an arcuate path for pitting a fruit half, and means for modifying the normal path of travel of said blade upon turning the shaft whereby the blade will enter the fruit abruptly at the beginning of its stroke.

12. In a fruit pitting mechanism of the character described, a revolvable shaft, an arched blade carried thereby and adapted upon turning of the shaft to travel in an arcuate path for pitting a fruit half, and cam means arranged for modifying the normal path of the blade upon turning the shaft.

13. In a fruit pitting mechanism of the character described, a revolvable shaft, a carrier mounted thereon and resiliently urged thereagainst, an arched blade on said carrier adapted upon turning of the shaft to travel in an arcuate path for pitting a fruit half, and means active against the carrier adapted to move same outwardly from the shaft to modify the normal path of travel of the blade upon turning the shaft.

14. In a fruit pitting mechanism of the character described, a revolvable shaft having an offset portion, an arched blade pivotally supported on the offset portion and rotatable bodily with the shaft, and flexible driving means extending along the side of the shaft arranged for oscillating the blade on its pivotal support.

15. In a fruit pitting mechanism of the character described, a revolvable shaft having an offset portion, an arched blade carried on a rocker arm pivotally supported on the offset portion, a Bowden cable extending along the shaft having its wire secured to the rocker arm for oscillating the same, and means for oscillating the wire.

16. In a fruit pitting mechanism of the character described, a bowed blade mounted to move in an arcuate path to cut around a half pit in a fruit half, means for resiliently forcing the blade toward the pit, and means for pre-determining the path of travel of the blade for a portion of its distance irrespective of the pit.

17. In a fruit pitting machine of the character described, a revolvable shaft, a blade mounted thereon adapted to swing in a curve to cut out a half pit of a half fruit presented thereto upon turning the shaft, resilient means for turning the shaft to swing the blade and whereby the blade may lag upon meeting an obstruction in cutting the fruit, and means controlled by the operator for reversing the shaft before completion of the cut whereby the blade is returned to starting position.

18. In a fruit pitting machine of the character described, a revolvable shaft, a blade mounted thereon adapted to swing in a curve to cut out a half pit of a half fruit presented thereto upon turning the shaft, automatic means for turning the shaft to swing the blade through the fruit, and means for optionally interrupting the travel of the blade during the cutting operation and for returning it to starting position.

19. In a fruit pitting machine of the character described, a curved blade mounted to travel in an arcuate path adapted to cut out a half pit from a half fruit presented thereto, means for automatically swinging the blade through the fruit when in position thereover, and manually operated means for breaking the automatic connection whereby the blade is held free of the fruit with the machine free to run.

20. In a fruit pitting machine of the character described, a blade mounted to travel in an arcuate path adapted to cut out a half pit from a half fruit presented thereto, means for automatically swinging the blade in its path through the fruit when in position thereover, and manually operated means for breaking the automatic connection and for throwing the blade to starting position from any point of its stroke free of the fruit with the machine free to run.

21. In a fruit pitting machine of the character described, a blade mounted to travel in an arcuate path adapted to cut out a half pit from a half fruit presented thereto, means for automatically swinging the blade in its path through the fruit when in position thereover, and manually operated means for breaking the automatic connection to the blade and for throwing the blade to starting position free of the fruit, manually controlled means for locking the blade in free position, and means for starting the machine with the blade so locked.

22. In a fruit pitting machine of the character described, a blade mounted to travel in an arcuate path adapted to cut out a half pit from a half fruit presented thereto, means for automatically swinging the blade in its path through the fruit when in position thereover, and manually operated means for breaking the automatic connection to the blade and for locking the blade in free position, and means for unlocking the blade effective only upon stopping the machine.

JOSEPH P. BEM.